March 12, 1940.  J. F. SOPER  2,193,081
LAMINATED RUBBER TENSION SPRING FOR MOTOR VEHICLE SUSPENSION
Original Filed Aug. 28, 1936
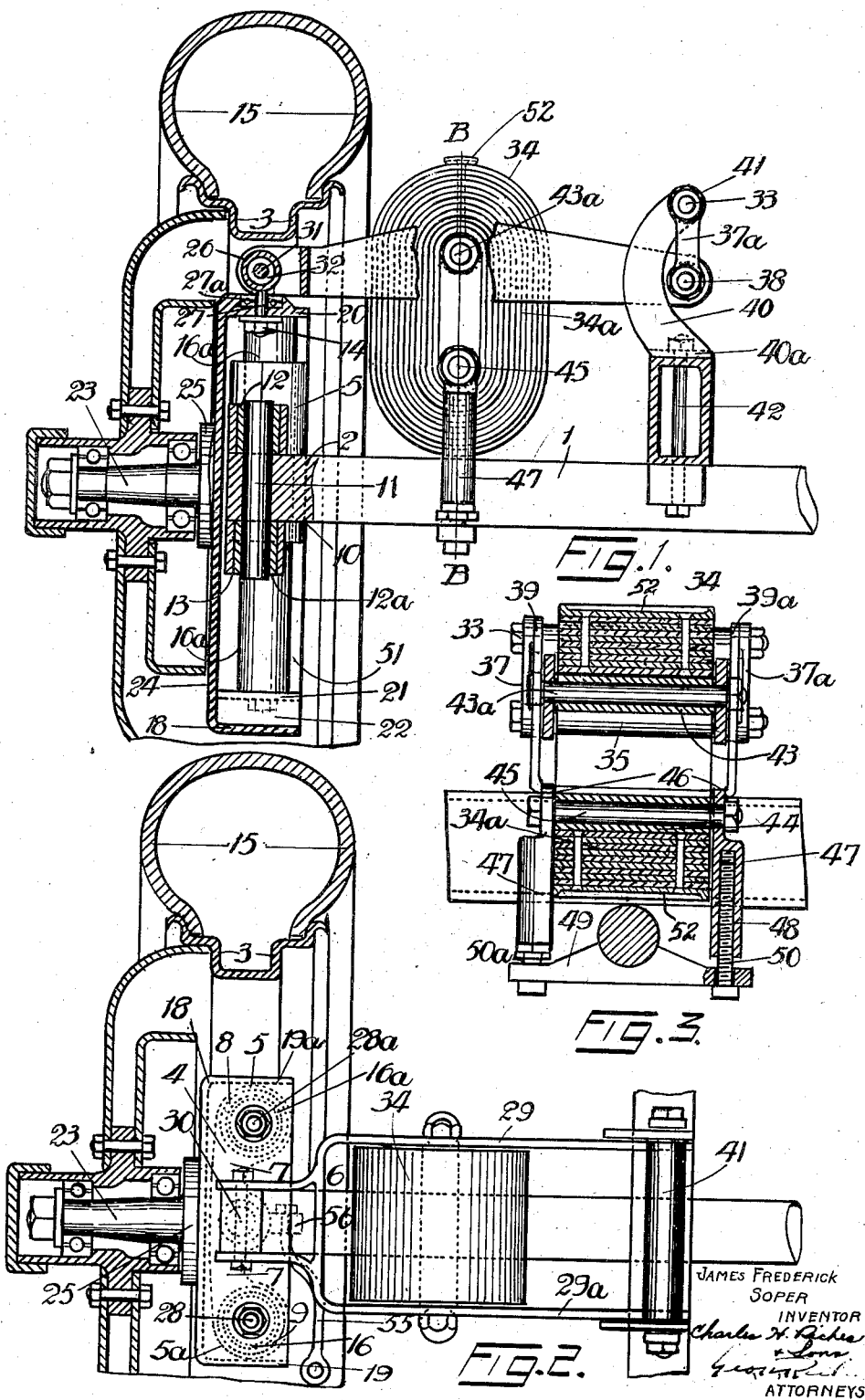
JAMES FREDERICK SOPER
INVENTOR
ATTORNEYS Patented Mar. 12, 1940

2,193,081

UNITED STATES PATENT OFFICE 2,193,081

LAMINATED RUBBER TENSION SPRING FOR MOTOR VEHICLE SUSPENSION

James Frederick Soper, Balclutha, New Zealand

Original application August 28, 1936, Serial No. 98,363. Divided and this application August 16, 1937, Serial No. 159,214

1 Claim. (Cl. 267—21)

This invention relates to spring suspending the front wheels of motor cars and motor driven vehicles.

The object of the invention is to provide a laminated rubber tension spring, in lieu of coiled helical or leaf springs, for an independent front wheel springing system. The vehicle weight being carried by the laminated rubber tension spring mounted outside the wheel rim through levers to a central pivot on the brake anchorage plate aligned with the pivot pin.

It will be apparent, that as the laminated rubber tension spring is mounted outside the wheel, the wheel displacement is not unduly limited, as the wheel displacement will always be greater than the extension of the laminated rubber tension spring.

This application is a divisional application of my United States application Serial No. 98,363, filed August 28, 1936.

Moreover, the laminated rubber tension spring may be built of tested rubber of any thickness and strength required, so that a much greater progressive resistance to extension can be obtained therefrom.

In the accompanying drawing—

Figure 1 represents a part central vertical section through a portion of a wheel structure, and a part side elevation showing the laminated rubber tension spring embodying my invention.

Figure 2 is a part transverse section of a wheel structure showing a plan of the springing system and the laminated rubber tension spring.

Figure 3 is a sectional elevation of the laminated rubber tension spring on the line B—B in Figure 1.

Referring to the drawing, the invention is characterized by a construction in which the axle beam 1 is disposed transversely under or over the longitudinal frame members of the vehicle and rigidly attached to the frame members.

The end 2 of the axle beam 1 extends outward into the centre plane of the wheel 3 which is deeply dished.

A double guide block 4 of substantial construction, which may be a casting or forging, is formed with partly cylindrical portions as at 5 and 5a at each end of the centre boss 6 joined thereto by webs 7. These end cylindrical portions of the double guide block 4, are each formed with a bore into which bushes or sleeves 8 and 9 are driven.

The double guide block 4 is formed with a central opening 10 therethrough to accommodate the end 2 of the axle beam 1, the guide block being pivotally mounted on a pin 11 in the end of the axle beam. A portion of the pin 11 extends above and below the axle beam, the upper extension engaging in a bush 12 and the lower extension engaging in a bush 12a provided in the bore 13 of the central boss 6 of the guide block. As the pivot pin 11 has to be passed an easy fit into the bushes 12 and 12a, the centre portion of the pin 11 may be secured in position in the bore in the end 2 of the axle beam by means of a set screw, tapered pin or the like.

The vertical axis of the pivot pin 11 is aligned with the centre of the tyre tread 15 of the wheel 3.

Two cylindrical tubular members 16 and 16a are provided, one engaging in the bore of the bush 8, the other in the bore of the bush 9 of the guide block 4; the ends of the tubular members are closed by means of spigotted washers.

The brake anchorage plate 18 is shown in Figures 1 and 2 of the drawing and is surrounded by a rim; the rim extends outwardly a sufficient distance to house the double guide block 4. The sides 19 and 19a, of the brake anchorage plate, are parallel to each other; the upper end 20 is formed to support a universal joint 26, the lower end 21 being formed with a central channel shaped recess 22 to allow for a greater up and down displacement of the wheel 3 relative to the guide block 4.

A stub axle 23, on which the wheel 3 is free to revolve, extends outward at right angles from the outer surface 24 of the brake anchorage plate 18. The stub axle may form an integral part of the brake anchorage plate, or it may be secured thereto by welding the flange 25 to the surface 24 of the anchorage plate 18.

The universal T shaped joint 26 is disposed in the upper end plate 20, the vertical pivot pin 27 thereof is in alignment with the pivot pin 11 in the end 2 of the axle beam. The load is carried on a ball or roller bearing 27a disposed on the vertical pin 27 and resting in a recess provided in the upper end plate 20, between the upper surface of the end plate and the horizontal surface of the universal joint. The vertical pivot pin 27 is secured to the underside of the end plate 20 by means of a nut 14 with a thrust washer interposed between the under surface of the plate 20 and the nut.

The circular tubular members 16 and 16a each engage with and are free to slidably move in their respective bushes 8 and 9 in the guide block 4. The guide block 4, with the circular tubular members 16 and 16a, when mounted on the pivot pin 11 in the end 2 of the axle beam 1, and the anchorage plate 18 passed onto the tubular members, the outer surface of the spigotted washers, in the ends of the tubular members, contact with the inner surface of the upper and lower rims 20 and 21 of the brake anchorage plate 18. The tubular members 16 and 16a being secured to the upper and lower rims 20 and 21 of the brake anchorage plate 18 by the clamping bolts 28 and 28a.

A lever is provided consisting of two plates 29 and 29a, the outer end of the levers are spaced to be passed onto the ends of the horizontal part 30 of the universal joint 26 and pivotally mounted thereto on a pin or bolt 31 secured by means of a nut.

To reduce friction the pin or bolt 31 may be provided with needle rollers, or the like, disposed in the recess 32 around the pin or bolt 31.

The plates 29 and 29a of the lever, beyond the brake anchorage plate 18, are spaced wider apart to permit a rubber tension spring being passed between the plates.

To stiffen the inner ends of the lever plates 29 and 29a a sleeve or distance piece 35 is provided and disposed between them. Each inner end of the lever plates is pivotally mounted to the lower end of a link or shackle 37 and 37a, a bolt 38 securing the link and sleeve in position. The upper ends of each link or shackle 37 and 37a is pivoted to the eyes 39 and 39a of a bracket 40; a sleeve or distance piece 41 is disposed between the eyes of the bracket 40, a bolt 33 being passed into the links 37 and 37a, eyes 39 and 39a of the bracket 40, and sleeve 41, the bolt 33 being secured by means of a nut.

The base 40a of the bracket 40 is preferably secured to a side frame of the vehicle by means of bolts 42.

The rubber tension spring 34 may be moulded and shaped to the required section. The rubber tension spring may be constructed of a band of rubber, or other suitable elastic material, of the required width and thickness, wound, under increasing tension, round the upper and lower sleeves 43 and 44, the sleeves, when winding the band thereon, being held at their respective distance apart by means of a removable spacing block, by this means forming a laminated rubber tension spring.

The coils or layers 34a of the rubber band forming the laminated rubber tension spring may be prevented from uncoiling by means of spaced clamps 52, one of the clamps being located just above the upper sleeve 43 and the other one immediately below the lower sleeve 44, or they may be secured together by other suitable means. The clamps also prevent the equalizing of the tension of the strands relative to each other.

In forming the laminated rubber tension spring the outer coils are wound under greater tension than the inner coils; by this construction the initial load is carried by the outer coils, the inner coils being stressed only when the maximum load is applied.

It will be apparent that, the strength of the laminated rubber tension spring is determined by the number and thickness of the coils or laminations thereon. Moreover, as only the surface of the outer coil and the edges of the laminations are exposed to the atmosphere, the rubber, or material of which the spring is constructed, will not deteriorate readily.

The laminated rubber tension spring is light, consequently, convenient to handle, compact and powerful, and may be housed in a confined space.

As hereinbefore mentioned, the rubber spring is disposed between the plates 29 and 29a forming the lever, a substantial bolt 43a is then passed through holes in the side plates of the lever and the sleeve 43 secured therein by means of a nut. The lower sleeve 44, in the rubber spring 34, is securely held in position by means of a substantial bolt 45 passed through holes in each lug 46 of a tension screw 47 disposed at each side of the rubber spring; each tension screw is provided with a threaded bore 48. The rubber spring is preferably enclosed in a suitable case to protect it from weather conditions or oil.

A substantial bar or lug 49 is rigidly secured to the axle beam 1 which is provided with a hole at each side, the centres of the holes being aligned with the centres of the threaded bores 48 in the sleeves 47. A threaded bolt 50 is passed into each hole and engage in the threaded bore 48 of its tension screw; a lock nut 50a is provided to prevent the threaded bolts 50 from slackening.

The double guide block 4 is housed in the space 51 bounded by the projecting rim around the brake anchorage plate. The partially enclosed space 51 may be completely enclosed by providing a cover plate over the opening 51. The cover plate may be secured to the surrounding rim of the brake anchorage plate by screws or other well known means.

The steering is effected from the steering mechanism through connections with an arm 55 having a tapered end to engage a corresponding tapered bore in a lug 56 secured therein by means of a nut. The lug 56 projects from the boss 6 of the double guide block.

The wheels 3 are caused to turn in unison on the pivot pin 11 by coupling the arms 55 with a tie or track rod.

Means is provided for lubricating the bushes or sleeves 8 and 9 in the double guide block 4 in which the tubular members 16 and 16a slidably engage, and the upper and lower portions of the pivot pin 11 which engage in the bushes 12 and 12a in the centre boss 6 of the double guide block 4, by providing oil wells or the like in a suitable position having oil ways or pipes leading therefrom to the rubbing surfaces of the wearing parts.

A rubber block may be provided in a suitable position on the axle beam so as to prevent clashing on recoil. A shock-absorber may be fitted between the sides 29 and 29a of the lever and the axle beam.

The aforementioned description of the springing system, with the laminated rubber tension spring, applies only to one front wheel. It will be understood, however, that the opposite front wheel is provided with a duplicate mechanism.

Having thus fully described my invention what I claim as new and desire to secure by Letters Patent is:

An extensible device for use as a shock absorber comprising a pair of spaced bushes, a rubber band wound around said bushes under progressively increasing tension to form a plurality of resilient strands, each outwardly lying strand being under greater tension than the inwardly lying adjacent strand and separate means securing said strands together at spaced points to prevent uncoiling and the equalizing of the tension of the strands relative to each other.

JAMES FREDERICK SOPER.